(12) United States Patent
Skachkov et al.

(10) Patent No.: US 10,739,241 B2
(45) Date of Patent: Aug. 11, 2020

(54) TEST APPARATUS FOR ESTIMATING LIQUID DROPLET FALLOUT

(71) Applicant: Schlumberger Technology Corporation, Sugar Land, TX (US)

(72) Inventors: Roman Alexandrovich Skachkov, Novosibirsk (RU); Konstantin Mikhailovich Serdyuk, Novokuznetsk (RU); Grigory Yurievich Mikhalev, Novosibirsk (RU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 238 days.

(21) Appl. No.: 15/534,505

(22) PCT Filed: Dec. 17, 2014

(86) PCT No.: PCT/IB2014/003095
§ 371 (c)(1),
(2) Date: Jun. 9, 2017

(87) PCT Pub. No.: WO2016/097785
PCT Pub. Date: Jun. 23, 2016

(65) Prior Publication Data
US 2019/0003949 A1    Jan. 3, 2019

(51) Int. Cl.
*G06K 9/00* (2006.01)
*G01N 15/02* (2006.01)
(Continued)

(52) U.S. Cl.
CPC ........... *G01N 15/0227* (2013.01); *F23G 7/08* (2013.01); *G01N 1/38* (2013.01); *G06T 7/0004* (2013.01);
(Continued)

(58) Field of Classification Search
None
See application file for complete search history.

(56) References Cited

U.S. PATENT DOCUMENTS 2,918,893 A * 12/1959 Norton .................... G01M 3/12
                                                    116/206
3,222,924 A    12/1965 Gaston
(Continued)

FOREIGN PATENT DOCUMENTS

EA    200801459 A1    10/2008
GB       2242373 A    10/1991
(Continued)

OTHER PUBLICATIONS

Vision based flame detection—analysis, Suzilawati Mohd Razmi et al., IEEE,978-1-4244-8648-9, 2010, pp. 187-191 (Year: 2010).*
(Continued)

*Primary Examiner* — Jayesh A Patel
(74) *Attorney, Agent, or Firm* — Cameron R. Sneddon

(57) ABSTRACT

A method is for determining information about liquid droplet fallout during operation of a gas-liquid flare apparatus. The method includes disposing a plurality of tiles in a spaced apart fashion over a monitoring area. A gas hydrocarbon fuel is injected into the gas-liquid flare apparatus to create a combustible flow, and a test fluid is injected into the gas-liquid flare apparatus such that the test fluid is dispersed into the combustible flow. The combustible flow is combusted in in the gas-liquid flare apparatus, resulting in fallout of liquid droplets of the test fluid onto the plurality of tiles. Images of the liquid droplets on the plurality of tiles are analyzed so as to determine the information about liquid droplet fallout in the monitoring area, using a computer. The information about liquid droplet fallout may be used to estimate combustion inefficiency of the gas-liquid flare apparatus.

22 Claims, 2 Drawing Sheets

(51) Int. Cl.
*G01N 1/38* (2006.01)
*F23G 7/08* (2006.01)
*G06T 7/62* (2017.01)
*G06T 7/00* (2017.01)
*G01N 21/94* (2006.01)

(52) U.S. Cl.
CPC ............ *G06T 7/62* (2017.01); *F23N 2229/20* (2020.01); *G01N 21/94* (2013.01); *G06T 2207/10024* (2013.01); *G06T 2207/20072* (2013.01)

(56) References Cited

U.S. PATENT DOCUMENTS

| | | | | |
|---|---|---|---|---|
| 4,440,227 | A * | 4/1984 | Holmes | E21B 43/243 166/261 |
| 4,746,290 | A * | 5/1988 | DeCicco | F23G 5/24 432/19 |
| 4,766,822 | A * | 8/1988 | De Cicco | F23G 5/008 110/212 |
| 4,825,094 | A | 4/1989 | Borden et al. | |
| 4,925,389 | A * | 5/1990 | DeCicco | F23G 5/008 432/106 |
| 5,430,293 | A * | 7/1995 | Sato | G01M 3/38 250/330 |
| 5,467,640 | A * | 11/1995 | Salinas | E03F 7/12 254/134.4 |
| 6,010,674 | A * | 1/2000 | Miles | B01D 53/1425 423/245.3 |
| 7,493,952 | B2 * | 2/2009 | Ayasse | E21B 43/305 166/261 |
| 8,307,770 | B2 * | 11/2012 | Clarke | F23G 5/027 110/171 |
| 9,528,929 | B2 * | 12/2016 | Chenault | G01N 21/21 |
| 10,234,354 | B2 * | 3/2019 | Badawy | G06T 7/001 |
| 10,577,248 | B2 * | 3/2020 | Harper, Jr. | C12M 43/08 |
| 2003/0063006 | A1 * | 4/2003 | Gutta | G06T 7/254 340/603 |
| 2009/0071382 | A1 * | 3/2009 | Clarke | F23G 5/027 110/346 |
| 2010/0127173 | A1 * | 5/2010 | Schmidt | G01M 3/38 250/338.5 |
| 2013/0147962 | A1 * | 6/2013 | Siann | H04N 7/181 348/159 |
| 2014/0064553 | A1 * | 3/2014 | Knauth | G06K 9/00771 382/103 |
| 2016/0275699 | A1 * | 9/2016 | Lu | G06T 7/0004 |
| 2017/0228882 | A1 * | 8/2017 | Dillingham | G01N 13/02 |
| 2017/0248308 | A1 * | 8/2017 | Makarychev-Mikhailov | E21B 43/267 |

FOREIGN PATENT DOCUMENTS

| | | |
|---|---|---|
| RU | 2405933 C1 | 12/2010 |
| RU | 2454535 C1 | 6/2012 |
| WO | WO1987007024 A1 | 11/1987 |
| WO | WO-2006082169 A1 * | 8/2006 ............... F23G 7/08 |

OTHER PUBLICATIONS

Oil spill detection—Thresholding, Reem Alattas, IEEE, 978-1-4799-5835-1, 2014, pp. 709-713 (Year: 2014).*

Enviornmentally Safe—Operations, Timothy M. Young, SPE35687, 1996, pp. 369-380 (Year: 1996).*

Timothy M. Young, "Environmentally Safe Burner for Offshore WellTesting Operations" SPE-35687, Presented at the SPE Western Regional meeting held in Anchorage, Alaska, May 22-24, 1996 (12 Pages).

International Search Report and Written Opinion issued in the related PCT Application PCT/IB2014/003095, dated Nov. 5, 2015 (7 pages).

* cited by examiner

TEST APPARATUS FOR ESTIMATING LIQUID DROPLET FALLOUT

FIELD OF THE DISCLOSURE

This disclosure relates to the field of pollution monitoring, and, more particularly, to the monitoring of liquid dropout fallout resulting from burning a combustible flow.

BACKGROUND

In the oilfield industry, gas flaring or gas-liquid flaring remains a commonly used approach for handling of waste fluids produced in exploration wells or during well testing operations, since transportation of oil-contaminant waste from remote well-sites may be prohibitively expansive (for example, this situation is typical for offshore well testing). Progress has been achieved in the designing of gas flare apparatuses for gas combustion, and in the designing of multiphase flare apparatuses for fluid flows which include water, oil, gas condensate, and natural gas. However, evaluating performance of these flare apparatuses remains difficult, with well testing operators left to using indirect evidence, such as the absence of black smoke in the flame (which is an indicator of proper fuel/oxygen ratio in the flaring mixture and absence of soot) or relatively small amount of oily film on sea surface (which is an indicator of low fallout of oil droplets).

Conventional tools for the monitoring of combustion inefficiency are not applicable for open-atmosphere flare apparatuses. For open-air flare apparatuses, such as gas flare and liquid-gas flare apparatuses, the operation is complicated by external factors. For example, the content of waste fluid is unpredictable for some wells, and the completeness of fuel combustion depends on a variety of factors, such as the burner design, the fuel droplet size entering the flame, the fuel flow rate, and the atmospheric conditions for flame (such as wind strength and direction). The main outlet products of fuel combustion for this situation are carbon dioxide and water vapor (for the case of combustion of hydrocarbons), gaseous unburned products like CO, NOx, light alkanes and their derivatives, sulfur oxides, soot particles, droplets of water, and droplets of oil. Thus, it is desirable to have a method for estimating the fallout of liquid droplets around an open-air fuel burner in the nearest vicinity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A first method aspect is directed to a method of determining information about of liquid droplet fallout during operation of a gas-liquid flare apparatus. The method may include disposing a plurality of tiles in a spaced apart fashion over a monitoring area. A gas hydrocarbon fuel may be injected into the gas-liquid flare apparatus to create a combustible flow, and a test fluid may be injected into the gas-liquid flare apparatus such that the test fluid is dispersed into the combustible flow. The combustible flow may be combusted in the gas-liquid flare apparatus, resulting in fallout of liquid droplets of the test fluid onto the plurality of tiles. Images of the liquid droplets on the plurality of tiles may be analyzed so as to determine the information about liquid droplet fallout in the monitoring area, using a computer.

Another aspect is directed to a test apparatus for use at a hydrocarbon well site at which a gas-liquid flare apparatus is operated to burn a combustible flow including a gas hydrocarbon fuel with a test liquid dispersed therein. The test apparatus may include a plurality of tiles disposed in a spaced apart arrangement over a monitoring area around the gas-liquid flare apparatus. A camera and a computer may cooperate to analyze images of liquid droplets of the test fluid that precipitated onto the plurality of tiles as fallout during combustion of the combustible flow by the gas-liquid flare apparatus so as to determine information about liquid droplet fallout in the monitoring area.

A second method aspect is directed to a method of determining a volume of liquid droplet fallout during operation of a gas-liquid flare apparatus at a hydrocarbon well site. The method may include disposing a plurality of tiles in a spaced apart arrangement over a monitoring area. A gas hydrocarbon fuel may be injected into the gas-liquid flare apparatus to create a combustible flow, and a test fluid may be injected into the gas-liquid flare apparatus such that the test fluid is dispersed into the combustible flow. The combustible flow may be combusted in the gas-liquid flare apparatus, resulting in fallout of liquid droplets of the test fluid onto the plurality of tiles. An image of each tile of the plurality thereof may be captured. Each image of each tile having liquid droplets thereon may be analyzed so as to estimate the volume of liquid droplet fallout in the monitoring area, using a computer.

DETAILED DESCRIPTION

One or more aspects of the present disclosure will be described below. These described aspects are but examples of the presently disclosed techniques. Additionally, in an effort to provide a concise description, some features of an actual implementation may not be described in the specification.

Figure 1:
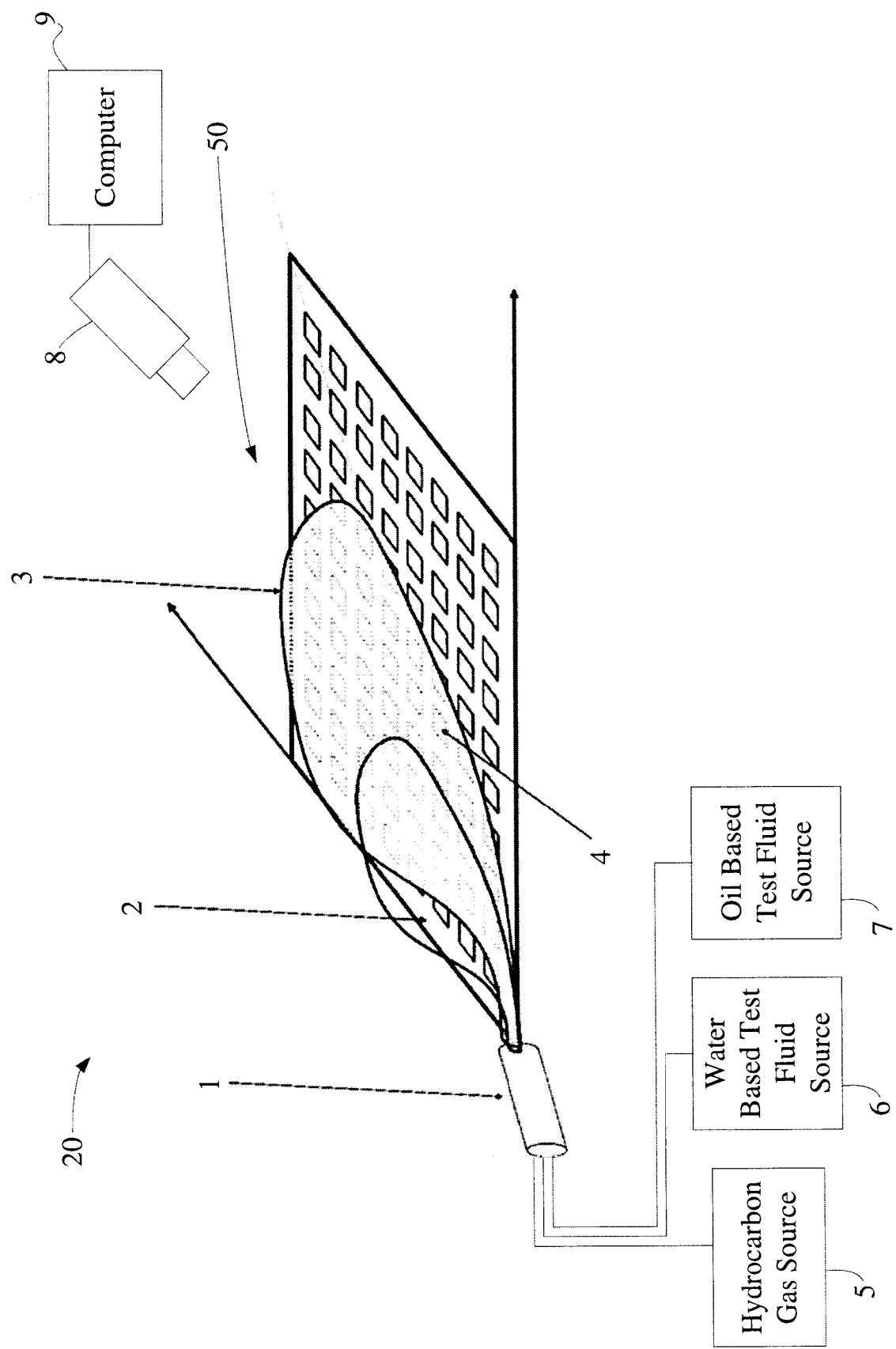
FIG. 1 is a schematic perspective view of a test apparatus for use at a hydrocarbon well site at which a gas-liquid flare apparatus is operated, in accordance with this disclosure.

With reference to FIG. 1, a test apparatus 20 for use at a hydrocarbon well site at which a gas-liquid flare apparatus 1 is operated is now described. The test apparatus 20 is used to measure liquid droplet fallout during operation of the gas-liquid flare apparatus 1 in a test mode, so as to generate various estimates about liquid droplet fallout during operation of the gas-liquid flare apparatus 1 in a normal operation mode. The gas-liquid flare apparatus 1 is of a type commonly used in the oilfield industry.

A series of tiles 4 are arranged in a pattern across a monitoring area 50 around the gas-liquid flare apparatus 1, and serve to catch liquid droplet fallout during operation of the gas-liquid flare apparatus 1. The tiles 4 are constructed from a heat resistant material capable of withstanding temperatures around the gas-liquid flame apparatus 1 up to and beyond 200° C., such as a ceramic. The tiles 4 are illustratively arranged in a evenly spaced apart mesh pattern, although it should be appreciated that other patterns may be used, and that the tiles 4 need not be evenly spaced. The tiles may be placed such that approximately 1% to 10%, or 2% to 5%, of the surface area of the monitoring area 50 is covered by the tiles. In addition, the tiles 4 are shown as uniform in shape, size, color, and material, although it should also be appreciated that in some applications they may not be. With respect to color, it is useful for the tiles 4 to be a light color, such as white, or light blue.

The gas-liquid flare apparatus or burner 1 is in fluid communication with a hydrocarbon gas source 5, a water based test fluid source 6, and an oil based test fluid source 7. The hydrocarbon gas source 5 feeds natural gas, methane, or any other gas produced from a wellhead. The water based test fluid source 6 feeds water, for example, with an inorganic colorant dispersed therein. The oil based test fluid source 7 feeds diesel, for example, with an inorganic colorant dispersed therein that is a different color than the inorganic colorant dispersed in the water from the water based test fluid source 6 so that the two test fluids are contrasting in color. The oil based test fluid source 7 may, rather than feed diesel, in some applications, feed an oil-based liquid with rheology parameters close to the oil component of a local wellhead. The colorants for the test fluid are selected such that they contrast with the color of the tiles 4, for ease of visual identification and analysis.

The hydrocarbon gas source 5 feeds the natural gas into a feed line (not shown) in the liquid flare apparatus, and similarly the water based test fluid source 6 and oil based test fluid source 7 feed their respective fluids into the feed line. The hydrocarbon gas source 5 may feed the natural gas into the feed line at a higher rate of flow and/or at a greater pressure than the water based test fluid source 6 and the oil based fluid source 7 feed their respective fluids so as to help atomize the water based test fluid and the oil based test fluid.

The flow rates of the hydrocarbon gas, water based test fluid, and oil based test fluid are set by their respective sources, in some cases under control of the computer 9, to match known flow rates during operation of the gas-liquid flare apparatus 1 in a normal operation mode. This way, the test apparatus 20 can be used to make estimations about liquid droplet fallout caused by operation of the gas-liquid flare apparatus 1 under specific known conditions when operating in the normal operation mode. The flow rates can be held status during operation of the gas-liquid flare apparatus 1 during the test mode.

In some applications, the test apparatus 20 has a multiphase flowmeter (not shown) associated therewith to measure the fluid flow through the gas-liquid flare apparatus 1 during normal operation. These measurements can be recorded during a given period of normal operation, and then be used to dynamically set the flow rates for the hydrocarbon gas, water based test fluid, and oil based test fluid during operation of the gas-liquid flare apparatus 1 in the test mode so as to more accurately make estimations about liquid droplet fallout during a given period of normal operation.

The feed tube feeds into a nozzle, which expels the natural gas and test fluids into the combustion chamber of the gas-liquid flare apparatus 1 as a combustible flow where it is ignited in a flame plume 2. Due to the multi-phase pattern of this combustible flow, some droplets of the test fluids as sprayed from the nozzle are not ignited because they are unable to reach the flame zone, and ultimately become a first source of liquid fallout in a liquid fallout plume 3 dispersed into the air to land on the tiles 4. Some droplets of the test fluids as sprayed from the nozzle, such as larger high velocity droplets, are not ignited despite reaching the flame zone, and ultimately become a second source of liquid fallout dispersed into the air in the liquid fallout plume 3 to likewise land on the tiles 4.

Figure 2:
FIG. 2 is an enlarged perspective view of a tile from FIG. 1 with liquid droplets on its surface.

A camera 8, such as a charge coupled device camera, captures images of the liquid droplets of the water based test fluid and oil based test fluid on the tiles 4. A sample image of liquid droplets on a tile 4 is shown in FIG. 2. A computer 9 performs image analysis on the images to determine information about the liquid droplet fallout in the monitoring area, which can ultimately be used to make estimates about liquid droplet fallout during normal operation of the gas-liquid burner 1 and/or estimates about combustion inefficiency in the gas-liquid burner 1.

The estimate of combustion inefficiency as referred to above is a measure of inefficiency of the gas-liquid burner 1 in the form of droplet fallout. Determining an accurate estimate of combustion inefficiency in this case is quite useful for operators due to environmental regulations which involve limits on droplet fallout.

The computer 9 may perform image analysis on each image, or on images showing droplets of both the water based test fluid and the oil based test fluid, or on images showing droplets of either test fluid. The image analysis may separate the water based test fluid droplets from the oil based test fluid droplets, and separately determine information about the respective liquid droplet fallout in the monitoring area from each.

Performing image analysis on images showing droplets of both the water based test fluid and the oil based test fluid eliminates processing time wasted by the computer 9 on analyzing images of tiles 4 not having liquid droplets to them. In addition, this can also help eliminate processing time spent by the computer 9 on analyzing images of the tiles 4 with either water based test fluid droplets or oil based test fluid droplets but not both water based test fluid droplets and oil based test fluid droplets, because the number of such tiles 4 may be small enough such that this may not adversely affect the information determined by the image analysis.

The information determined by the image analysis can be a measure of liquid droplet fallout in the monitoring area 50, a measure of liquid droplet fallout on each tile 4, or an aggregate measure of liquid dropout fallout on the tiles 4. This measure may be volume of liquid, number of droplets, surface area of the droplets, or any other useful measure, and may be made based upon the combined droplets of from both the water based test fluid and the oil based test fluid, or may be made separately for each test fluid. The measure may then be used by the computer 9, or by another system, to make estimations about the liquid droplet fallout in the monitoring area 40, or in a wider area, from operation of the gas-liquid flare apparatus 1 when it is in the normal operation mode rather than the test mode, and burning a multiphase flow from a wellhead. For example, estimations may be made about oil and water droplet fallout, or about soot fallout. These estimates may include estimates of volume of droplets, number of droplets, diameter of droplets, surface area of droplets, size of the smear left on a given tile 4 by a given droplet, or other useful estimates.

The tiles 4 may be indexed to their respective positions in the monitoring area 50, and the computer 9 may determine a precipitation pattern of the liquid droplets in the monitoring area 50 based upon the amount of liquid droplets on each tile 4, together with the indexed position of that tile. This precipitation pattern may be used to estimate the precipitation pattern of the liquid droplets during operation of the gas-liquid flare apparatus 1 in the normal operation mode.

The above described estimates can be used to determine combustion inefficiency of the gas-liquid flare apparatus 1. The combustion inefficiency can then in turn be used to fine tune to gas-liquid flare apparatus 1 to reduce environmental effects of combustion, comply with local regulations regarding environmental effects, etc.

In greater detail, the computer 9 may use the above described estimates to generate a histogram of droplets by size. The computer 9 may then calculate a flow rate of the test fluids (either independently, or in combination) from the histogram, and may take a ratio of this calculated flow rate to a known or measured flow rate of the test fluids (also either independently, or in combination) in the gas-liquid flare apparatus 1. This ratio is then used to determine the combustion inefficiency, which in some applications represents the inefficiency of combustion of the liquids and not the inefficiency of combustion of the gas hydrocarbon fuel.

Although the test apparatus 20 has been described with reference to there being both a water based test fluid source 6 and an oil based test fluid source 7, in some applications, there may be but a single test fluid source for the sake of simplicity. Such a single test fluid source could be either a water based test fluid source, an oil based test fluid source, or a mix of the two.

In addition, although the test apparatus 20 and the techniques herein have been described with reference to use in the oilfield industry, it should be understood that the test apparatus 20 and techniques are useful in any application where estimation of combustion inefficiency of a liquid in open air is desired.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method of determining information about liquid droplet fallout during operation of a gas-liquid flare apparatus comprising:
   disposing a plurality of catch tiles in a spaced apart fashion over a monitoring area of the gas-liquid flare apparatus;
   injecting a gas hydrocarbon fuel into the gas-liquid flare apparatus to create a combustible flow;
   injecting a test fluid into the gas-liquid flare apparatus such that the test fluid is dispersed into the combustible flow;
   operating the gas-liquid flare apparatus to combust a portion of the combustible flow, resulting in fallout of liquid droplets of the test fluid onto the plurality of catch tiles; and
   using a computer to analyze images of the liquid droplets of the test fluid on the plurality of catch tiles so as to determine information about liquid droplet fallout of the test fluid in the monitoring area.

2. The method of claim 1, further comprising determining an inefficiency of the operation of the gas-liquid flare apparatus based upon the information about liquid droplet fallout of the test fluid in the monitoring area.

3. The method of claim 2, wherein the inefficiency is determined by forming a histogram of liquid droplet fallout of the test fluid in the monitoring area from the information about liquid droplet fallout of the test fluid in the monitoring area, calculating a first rate of the test fluid based upon the histogram, and determining a ratio between the first flow rate and a second flow rate representing a flow rate of the test fluid into the gas-liquid flare apparatus.

4. The method of claim 1, wherein each of the plurality of catch tiles has a position in the monitoring area; and wherein analyzing the images of the liquid droplets of the test fluid comprises analyzing the images of the liquid droplets of the test fluid on the plurality of catch tiles so as to determine the information about liquid droplet fallout of the test fluid on each catch tile, and determining the information about liquid droplet fallout of the test fluid in the monitoring area based upon the information about liquid droplet fallout of the test fluid on each catch tile and the position of the catch tile in the monitoring area.

5. The method of claim 4, further comprising determining a precipitation pattern of the liquid droplets based upon the information about liquid droplet fallout of the test fluid on each catch tile and the position of the catch tile in the monitoring area.

6. The method of claim 1, wherein analyzing the images of the liquid droplets of the test fluid comprises determining an aggregate area of the liquid droplets of the test fluid on each catch tile and determining the information about liquid droplet fallout of the test fluid based on the aggregate area.

7. The method of claim 1, wherein the information about liquid droplet fallout of the test fluid comprises a total volume of liquid droplet fallout of the test fluid in the monitoring area.

8. The method of claim 1, further comprising injecting an additional test fluid into the gas-liquid flare apparatus such that the additional test fluid is dispersed into the combustible flow; wherein operating the gas-liquid flare apparatus also results in fallout of liquid droplets of the additional test fluid onto the plurality of catch tiles;
   wherein analyzing the images of the liquid droplets of the test fluid comprises analyzing the images of the liquid droplets of the test fluid and the liquid droplets of the additional test fluid; and wherein the liquid droplets of the test fluid and the liquid droplets of the additional test fluid are contrasting in color.

9. The method of claim 8, wherein the information about liquid droplets of the test fluid in the monitoring area is determined based upon analyzing images of the liquid droplets from catch tiles where both liquid droplets from the test fluid and liquid droplets from the additional test fluid are present.

10. The method of claim 8, wherein the test fluid comprises a water-based fluid having a water-dispersible colorant dispersed therein; and
   wherein the information about liquid droplet fallout of the test fluid in the monitoring area indicates liquid droplet fallout.

11. The method of claim 8, wherein the additional test fluid comprises an oil-based fluid having an oil-dispersible colorant dispersed therein; and
   wherein the information about liquid droplet fallout of the additional test fluid in the monitoring area indicates oil droplet fallout.

12. The method of claim 1, wherein an exposed surface area of the plurality of catch tiles comprises at least 2% of the monitoring area.

13. The method of claim 1, wherein the gas hydrocarbon fuel is injected into the gas-liquid flare apparatus at a higher velocity than the test fluid.

14. The method of claim 1, wherein the plurality of catch tiles is contrasting in color with the liquid droplets.

15. The method of claim 1, wherein the catch tiles comprise ceramic tiles.

16. The method of claim 1, wherein the catch tiles are uniform in size and shape.

17. A test apparatus for use at a hydrocarbon well site at which a gas-liquid flare apparatus is operated to burn a combustible flow comprising a gas hydrocarbon fuel with a test fluid dispersed therein, the test apparatus comprising:
 a plurality of catch tiles disposed in a spaced apart arrangement over a monitoring area around the gas-liquid flare apparatus;
 a camera to capture images of liquid droplets of the test fluid that precipitate onto the plurality of catch tiles as fallout during operation of the gas-liquid flare apparatus, and a computer to analyze the images so as to determine information about liquid droplet fallout of the test fluid in the monitoring area.

18. The test apparatus of claim 17, wherein each catch tile has a position in the monitoring area; and wherein analyzing the images of the liquid droplets of the test fluid includes determining information about liquid droplet fallout of the test fluid on each catch tile and determining the information about liquid droplet fallout of the test fluid in the monitoring area is based upon the information about liquid droplet fallout of the test fluid on each catch tile and the position of the catch tile in the monitoring area.

19. The test apparatus of claim 17, wherein analyzing the images of the liquid droplets of the test fluid includes determining an aggregate area of the liquid droplets of the test fluid on each catch tile and determining the information about liquid droplet fallout of the test fluid based on the aggregate area.

20. The test apparatus of claim 17, wherein the information about liquid droplet fallout of the test fluid comprises a total volume of liquid droplet fallout of the test fluid over the monitoring area.

21. A method of determining a volume of liquid droplet fallout during operation of a gas-liquid flare apparatus at a hydrocarbon well site comprising:
 disposing a plurality of catch tiles in a spaced apart arrangement over a monitoring area of the gas-liquid flare apparatus;
 injecting a gas hydrocarbon fuel into the gas-liquid flare apparatus to create a combustible flow;
 injecting a test fluid into the gas-liquid flare apparatus such that the test fluid is dispersed into the combustible flow;
 operating the gas-liquid flare apparatus to combust a portion of the combustible flow, resulting in fallout of liquid droplets of the test fluid onto the plurality of catch tiles;
 capturing an image of each catch tile;
 analyzing the captured catch tile images of each catch tile of the plurality of catch tiles to estimate the volume of liquid droplet fallout of the test fluid on the plurality of catch tiles in the monitoring area, using a computer.

22. The method of claim 21, wherein each catch the has a position in the monitoring area; wherein analyzing the captured catch tile images of each catch title of the plurality of catch tiles comprises determining the volume of liquid droplet fallout of the test fluid on each catch tile, determining the volume of liquid droplet fallout of the test fluid in the monitoring area based upon the volume of liquid droplet fallout of the test fluid on each catch tile; and determining a precipitation pattern of the liquid droplets of the test fluid based upon the volume of liquid droplet fallout of the test fluid on each catch the and the position of the catch the in the monitoring area.

* * * * *